United States Patent Office 3,015,372
Patented Jan. 2, 1962

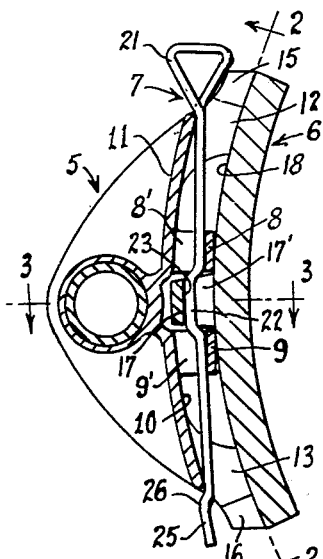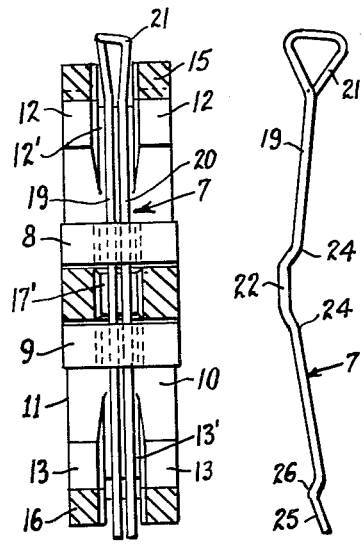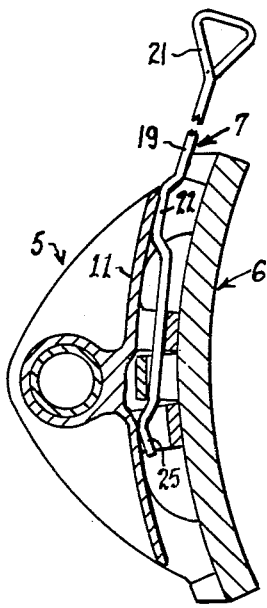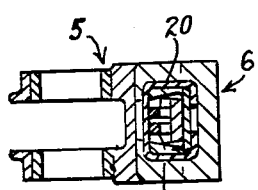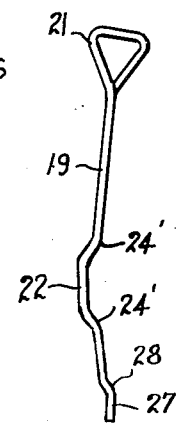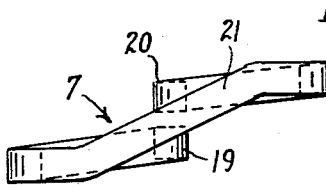

3,015,372
BRAKE SHOE KEY
Keith D. Landell, Laval Sur Le Lac, Quebec, and
Robert L. Lineker, Hudson, Quebec, Canada
Filed July 21, 1960, Ser. No. 44,494
6 Claims. (Cl. 188—243)

This invention relates to a key for securing a brake shoe to a brake head used in railroad equipment and includes means whereby the key, when in its locking position has a three point pressure contact between the shoe and head forcing the outer ends of the key into spring contact with the outer ends of the brake head and locking engagement therewith.

The invention consists essentially in forming the key from a single length of spring steel bent upon itself to form a spring head portion and two leg portions disposed in parallel relation to each other. The two leg portions have their medial portions offset in the form of a shallow channel and the lower end of each leg is offset to form a locking shoulder for engagement with the lower end of the brake head. The lower offset end of the two key legs provide a safety lock for engagement with the mid mating portions of the brake head and brake shoe in the event that the key is dislodged from its normal locking position by some external force such as flying ballast.

The object of the invention is to provide a brake shoe key of simple and inexpensive design which will positively lock the brake shoe with the brake head under heavy spring pressure with means to lock the key with both ends of the brake head.

A further object of the invention is to provide a brake shoe key having a safety locking feature applicable should the key be dislodged accidentally from its normal engaged position.

A further object of the invention is to provide a bifurcated brake shoe key, the separate legs of which each provide a lock between brake shoe and brake head.

These and other objects will be apparent from the following detailed specification and the accompanying drawings, in which:

FIG. 1 is a vertical section of an assembled brake head and brake shoe with the key in locking position.

FIG. 2 is a vertical section looking in the direction of the line 2—2 in FIG. 1.

FIG. 3 is a transverse section on the line 3—3 of FIG. 1.

FIG. 4 is a view similar to FIG. 1 but showing the key in its safety locking position.

FIG. 5 is a vertical side elevation of the key in its unstressed position.

FIG. 6 is an enlarged plan view of the top of the key.

FIG. 7 is a vertical side elevation of an alternative form of the key.

Referring to the drawings, the brake head 5 and the brake shoe 6 are of conventional construction of a type commonly in use in railroad equipment. The brake head and brake shoe are held in locked engagement by a key 7 of novel construction. The key 7 is so formed that when it is in its normal locking position it will hold the brake shoe in rigid engagement with the brake head and will continue to hold the shoe on the brake head even after the key is accidentally dislodged from its normal locking position by external forces such as a blow from flying ballast or other object.

The brake head 5 is provided with a pair of vertically spaced apart U-shaped lugs 8 and 9 which project from the forward face 10 of the arcuate plate 11 to provide vertically aligned keyway openings 8' and 9'. A pair of toe guide blocks 12 and 13 project forwardly from the upper and lower ends of the plate 11, each pair being spaced apart to form keyway guides 12' and 13' aligned with the keyway openings 8' and 9'.

The arcuate brake shoe 6 is provided with a pair of end stops 15 and 16 for mating engagement with the top and bottom ends of the toe guide blocks 12 and 13 of the brake head. A U-shaped lug 17 located medially of the brake shoe 6 and projecting outwardly from the rear face 18, fits into the space between the U-shaped lugs 8 and 9 of the brake head. This U-shaped lug 17 forms a keyway opening 17' also aligned with the keyway openings 8' and 9'.

The key 7, by means of which the brake shoe 6 is held firmly in engagement with the brake head 5, is formed from a single length of spring steel stock, and is bent upon itself to form a pair of legs 19 and 20 extending from the formed key head 21. The bending of the spring steel stock to form the key head 21 is midway of the length of the stock and is formed by offsetting the stock in the manner shown in FIG. 6 in order to bring the pair of legs 19 and 20 into side-by-side arrangement in a plane at right angles to the plane of the key head 21. In this form the key head 21 becomes a rather stiff spring and the legs 19 and 20 are free to take up their own position in the keyway formed by the brake head 5 and brake shoe 6. It will be noted that the legs 19 and 20 are spaced apart from each other as seen in FIGS. 2 and 3. This spacing apart allows for complete freedom of action of one leg with respect to the other. However, the legs could be in contact with each other without harmful effect.

The legs 19 and 20 are offset at 22 at a position lengthwise of the key which will locate the offset 22 directly facing against the inner surface 23 of the U-shaped lug 17 when the key is driven home into the position shown in FIG. 1. In this position the shoulders 24 formed by the offset 22 will bear against the inner surface of the U-shaped lugs 8 and 9. In the free position of the key 6, as shown in FIG. 5, the straight portions of the key legs 19 and 20 above and below the offset 22 are bent at an angle away from the vertical plane of the offset so that when the key is driven home as in FIG. 1, the pressure on the offset 22 and on the shoulders 24 will have the effect of straightening out the key into the plane of the offset 22 and forcing it into contact with the upper and lower ends of the plate 10 as shown in FIG. 1.

The lower end of the key head 21 at the point where the head joins the legs 19 and 21 form a stop which has the effect of accurately locating the offset 22 and the shoulders 24 with the U-shaped lugs 8, 9 and 17. The lower end of the legs 19 and 20 are offset at 25 and the formed shoulder 26 provides a lock with the lower end of the plate 10 holding the key from being dislodged in an upwards direction by normal forces encountered in railroad equipment of this type. However, should the lower end of the key 6 be dislodged from the locking position shown in FIG. 1 and be forced upwards by flying ballast or other objects, the lower offset 25 will take up the locking position shown in FIG. 4 while pressure is still maintained between the offset 22 and the top end of the plate 10. The offset 25 therefore, in the position shown in FIG. 4, provides a safety lock holding the brake shoe 6 on the brake head 5 under conditions which would normally cause the brake shoe to separate from its brake head.

A modified form of key is shown in FIG. 7. In this modified form the key is similar to that above described except that the legs 19 and 20 are cut short at a point above the shoulder 26 seen in FIGS. 1 and 5. The lower end of the shortened legs 19 and 20 are offset forwardly at 27 at a distance below the offset 22' so that the shoulder 28, formed by the offset 27 will lock under the lug 9 when the key is driven home, holding the key in place against accidental displacement.

In applying the key 7 to lock the brake shoe 6 on its brake head 5, the lower ends of the key are inserted into the keyway formed by the lugs 8, 9 and 17 and is then driven down in the keyway until the head 21 contacts the top end of the plate 11. In this position the offset 22 and the shoulders 24 should be properly aligned with the U-shaped lugs, forcing the key to straighten out and bring the upper end of the key against the top end of the plate 11 while the offset 25 is forced into locking engagement with the lower end of the plate 11. Any roughness or misalignment of the surfaces of the keyway will be compensated for by the two separate legs 19 and 20 of the key, each leg taking up a position relative to each other depending on the disposition of the surfaces of the keyway adjacent each leg. Any displacement of one leg relative to the other will be opposed by the spring of the formed head 21 of the key and so increase the locking pressure of the key with the brake head and brake shoe.

The formed key head 21 provides an opening accessible from the side of the brake assembly whereby a tozzle bar can be readily inserted through the key head for easy and safe removal of the key from its keyway.

What we claim is:

1. In a railroad brake assembly including a brake head and a brake shoe member, the said brake head including an arcuate plate having opposing outer end edges and a pair of U-shaped lugs projecting from the said arcuate plate and having keyway defining openings, the said lugs being in spaced relation to each other midway of the length of said arcuate plate, and said brake shoe having an attaching lug having an opening therethrough in alignment with the openings in the lugs on said arcuate plate, all of said openings being aligned to afford a keyway, a brake shoe key disposed in said keyway locking said brake shoe to said brake head, the said key being formed from a single length of steel stock bent upon itself midway of its length to form a pair of legs disposed in side-by-side arrangement, the said legs being offset from the common plane of the legs midway of their length to form a shallow transverse channel, the said legs being angled above and below the said offset towards the side of the legs in which is formed the transverse channel, the outer surface of said offset engaging with the surface of the opening through said brake shoe lug while those portions of the key adjacent the transverse channel engage with the surface of the openings in lugs of the brake head, the pressure of said lugs on said key straightening out the angled portions of the legs of the key and forcing said legs into pressure contact with said arcuate plate, and means to lock said key in said keyway comprising an offset at the lower end of the legs of the key, the said latter offset providing a shoulder engaging with the adjacent end of the said arcuate plate.

2. In a railroad brake assembly as set forth in claim 1, in which the means to lock the key in said keyway comprises an offset in the legs of the key below the said transverse channel, said latter offset providing a shoulder engaging with the lowermost lug on said brake shoe.

3. In a railroad brake assembly as set forth in claim 2, in which the offset in the legs of the key below the said transverse channel is in a direction opposite to that of the offset forming the transverse channel.

4. In a railroad brake assembly as set forth in claim 1, in which the bend midway of the steel stock forms a head for said key, the said head engaging with the upper end edge of said arcuate plate.

5. In a railroad brake assembly as set forth in claim 1, in which the bend midway of the steel stock is formed by offsetting the stock to bring opposing ends of the stock into planes parallel with and spaced apart from each other and then bending the stock to bring the opposing ends of the stock into side-by-side relation with each other to form the separate legs of the key.

6. In a railroad brake assembly as set forth in claim 1, in which the bend midway of the length of the steel stock forms a head for the said key, the said key head having an opening disposed transversely of the brake assembly for insertion of a key removing tool.

References Cited in the file of this patent
UNITED STATES PATENTS

| | | |
|---|---|---|
| 1,465,975 | Emery | Aug. 28, 1923 |
| 2,013,982 | Clouser | Sept. 10, 1935 |
| 2,138,196 | Prentice | Nov. 29, 1938 |
| 2,858,914 | Arrasmith | Nov. 4, 1958 |
| 2,873,825 | Prentice | Feb. 17, 1959 |